US012659038B2

(12) United States Patent
Huang et al.

(10) Patent No.: US 12,659,038 B2
(45) Date of Patent: Jun. 16, 2026

(54) OPTICAL POWER ADJUSTMENT SYSTEM AND OPTICAL POWER ADJUSTMENT APPARATUS

(71) Applicant: Huawei Technologies Co., Ltd., Shenzhen (CN)

(72) Inventors: Linbojie Huang, Shenzhen (CN); Chao Pan, Shenzhen (CN); Kai Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 296 days.

(21) Appl. No.: 18/496,264

(22) Filed: Oct. 27, 2023

(65) Prior Publication Data

US 2024/0056188 A1      Feb. 15, 2024

Related U.S. Application Data

(63) Continuation of application No. PCT/CN2022/086738, filed on Apr. 14, 2022.

(30) Foreign Application Priority Data

Apr. 30, 2021      (CN) .......................... 202110485437.9

(51) Int. Cl.
*H04B 10/2581* (2013.01)
*G02F 1/01* (2006.01)
(Continued)

(52) U.S. Cl.
CPC ....... *H04B 10/2581* (2013.01); *G02F 1/0121* (2013.01); *G02F 1/217* (2021.01);
(Continued)

(58) Field of Classification Search
CPC .............. H04B 10/2581; H04B 10/564; H04B 10/294; H04B 10/50; G02F 1/0121;
(Continued)

(56) References Cited

U.S. PATENT DOCUMENTS 6,222,955 B1 *    4/2001   Lagali ................... G02F 1/3136
                                                       385/20
6,253,000 B1 *    6/2001   Madsen ............. H04Q 11/0001
                                                       385/24
(Continued)

FOREIGN PATENT DOCUMENTS

WO          2015042040 A1      3/2015

OTHER PUBLICATIONS

Fei et al, A Two-Mode (De)Multiplexer Based on Multimode Interferometer Coupler, Feb. 2016, IEEE, All Document. (Year: 2016).*

(Continued)

*Primary Examiner* — Dibson J Sanchez
(74) *Attorney, Agent, or Firm* — Conley Rose, P.C.

(57) ABSTRACT

An optical power adjustment system includes a multi-mode light source, a mode demultiplexer, and an optical power adjustment apparatus. The multi-mode light source is configured to output a multi-mode optical signal, where the multi-mode optical signal includes N transverse-mode optical signals, $N=2^M$, and M is an integer greater than 1. The mode demultiplexer is configured to convert the N transverse-mode optical signals into N fundamental-mode optical signals, and output the N fundamental-mode optical signals. The optical power adjustment apparatus includes M optical power adjustment modules and a control apparatus, each optical power adjustment module includes a plurality of phase shifters, and the control apparatus is electrically connected to the M optical power adjustment modules. A $K^{th}$ optical power adjustment module includes $2^{K-1}$ multi-mode interferometers MMIs.

20 Claims, 4 Drawing Sheets

(51) Int. Cl.

| | |
|---|---|
| *G02F 1/21* | (2006.01) |
| *H04B 10/564* | (2013.01) |
| *H01S 3/067* | (2006.01) |
| *H01S 3/16* | (2006.01) |
| *H04B 10/50* | (2013.01) |
| *H04J 14/00* | (2006.01) |
| *H04J 14/04* | (2006.01) |

(52) U.S. Cl.
CPC ....... *H04B 10/564* (2013.01); *G02F 2203/50* (2013.01); *H01S 3/06754* (2013.01); *H01S 3/1608* (2013.01); *H04B 10/50* (2013.01); *H04J 14/00* (2013.01); *H04J 14/04* (2013.01)

(58) Field of Classification Search
CPC .. G02F 1/217; G02F 2203/50; H01S 3/06754; H01S 3/1608; H01S 3/094065; H01S 3/1001; H01S 3/094069; H04J 14/04; H04J 14/00
USPC ................... 398/43–103, 140–172, 182–201
See application file for complete search history.

(56) References Cited

U.S. PATENT DOCUMENTS

| | | | | |
|---|---|---|---|---|
| 6,292,597 | B1* | 9/2001 | Lagali | G02B 6/12011 |
| | | | | 385/17 |
| 10,126,572 | B2* | 11/2018 | Zhang | G02B 6/29302 |

| | | | | |
|---|---|---|---|---|
| 2001/0038735 | A1* | 11/2001 | Augustsson | H04J 14/0213 |
| | | | | 385/24 |
| 2010/0166427 | A1* | 7/2010 | Jeong | H04B 10/65 |
| | | | | 398/82 |
| 2011/0164305 | A1* | 7/2011 | Winter | H04B 10/505 |
| | | | | 359/279 |
| 2015/0043910 | A1* | 2/2015 | Koebele | H04B 10/25891 |
| | | | | 398/44 |
| 2016/0238795 | A1* | 8/2016 | Tan | G02F 1/3138 |
| 2016/0248519 | A1 | 8/2016 | Novack et al. | |
| 2016/0274438 | A1* | 9/2016 | Shimizu | G02F 1/3137 |
| 2018/0059332 | A1* | 3/2018 | Mansouri Rad | G02B 6/12004 |
| 2018/0175937 | A1* | 6/2018 | Yang | H04J 14/04 |
| 2023/0088292 | A1* | 3/2023 | Capasso | G02B 6/34 |
| | | | | 385/24 |

OTHER PUBLICATIONS

J.P. von der Weid et al.: "On the characterization of optical fiber network components with optical frequency domain reflectometry", Journal of Lightwave Technology vol. 15, No. 7, Jul. 1997, pp. 1131-1141.

J.P. von der Weid et al: "On the characterization of optical fiber network components with optical frequency domain reflectometry", Journal of Lightwave Technology vol. 15, No. 7, Jul. 1997, total 11 pages.

* cited by examiner

OPTICAL POWER ADJUSTMENT SYSTEM AND OPTICAL POWER ADJUSTMENT APPARATUS

CROSS-REFERENCE TO RELATED APPLICATIONS

This is a continuation of International Patent Application No. PCT/CN2022/086738, filed on Apr. 14, 2022, which claims priority to Chinese Patent Application No. 202110485437.9 filed on Apr. 30, 2021. The disclosures of the aforementioned applications are hereby incorporated by reference in their entireties.

TECHNICAL FIELD

This disclosure relates to the field of optical communication, and in particular, to an optical power adjustment system and an optical power adjustment apparatus.

BACKGROUND

An erbium-doped fiber amplifier (EDFA) can compensate for a loss caused by a fiber link. It plays an important role in application scenarios with a high link loss, such as long-distance optical communication, a wavelength-selective switch (WSS), and a programmable optical filter. A pump light source is an indispensable part of the EDFA. The magnitude of pump light power affects the gain of the erbium-doped fiber amplifier. Generally, a single-mode pump light source is expensive, while a multi-mode pump light source is cheap. However, because light output by the multi-mode pump light source has a plurality of transverse modes, the light cannot be directly applied to the EDFA. Generally, the light needs to be mode demultiplexed into a plurality of beams of single-mode light before being output.

In addition, because power of multi-mode light output by a multi-mode laser may be different, power of the plurality of beams of mode demultiplexed single-mode light needs to be equalized. In a current manner, power of light in different modes output by the multi-mode pump light source is first equalized by a scrambler. In this way, a mode demultiplexer converts the light in different modes output by the multi-mode pump light source into fundamental modes, and then respectively outputs the fundamental modes from a plurality of single-mode fibers. However, the scrambler equalizes the power of light in different modes by bending the fibers or in other manners. This manner has poor adjustment precision. If there are a large quantity of fundamental-mode optical signals after mode demultiplexing, it is difficult to ensure that power of light output by each single-mode fiber is the same.

SUMMARY

Embodiments of this disclosure provide an optical power adjustment system and an optical power adjustment apparatus. A mode demultiplexer may convert N transverse-mode optical signals output by a multi-mode light source into N fundamental-mode optical signals. By using the optical power adjustment apparatus, power of each fundamental-mode optical signal can be the same, power adjustment precision is higher, and applicability is wider.

According to a first aspect, this disclosure provides an optical power adjustment system. The optical power adjustment system includes: a multi-mode light source, a mode demultiplexer, and an optical power adjustment apparatus.

An output port of the multi-mode light source is connected to an input port of the mode demultiplexer, and an output port of the mode demultiplexer is connected to an input port of the optical power adjustment apparatus. The multi-mode light source is configured to output a multi-mode optical signal. The multi-mode optical signal includes N transverse-mode optical signals, $N=2M$, and M is an integer greater than 1. The mode demultiplexer is configured to convert the N transverse-mode optical signals into N fundamental-mode optical signals, and output the N fundamental-mode optical signals. The optical power adjustment apparatus includes M optical power adjustment modules and a control apparatus. Each optical power adjustment module includes a plurality of phase shifters, and the control apparatus is electrically connected to the M optical power adjustment modules. The M optical power adjustment modules are sequentially arranged from the input port of the optical power adjustment apparatus to an output port of the optical power adjustment apparatus, and the M optical power adjustment modules are connected together in series. A $K^{th}$ optical power adjustment module in the optical power adjustment apparatus includes $2K-1$ multi-mode interferometers (MMIs). Each MMI includes $2M-K+1$ input ports and $2M-K+1$ output ports, and $1 \leq K \leq M$. An $I^{th}$ input port or a $(2M-K+1-I+1)^{th}$ input port in the $2M-K+1$ input ports is connected to one phase shifter, where $1 \leq I \leq 2M-K+1$. The control apparatus is configured to adjust the phase shifters in the $K^{th}$ optical power adjustment module, to enable a phase difference between an optical signal input from the $I^{th}$ input port of each MMI in the $K^{th}$ optical power adjustment module and an optical signal input from the $(2M-K+1-I+1)^{th}$ input port of the MMI to be 0 or an integer multiple of $2\pi$. In this way, output optical power of the $I^{th}$ output port of each MMI in the $K^{th}$ optical power adjustment module may be the same as output optical power of the $(2M-K+1-I+1)^{th}$ output port of the MMI.

In this implementation, the optical power adjustment apparatus includes a plurality of levels of optical power adjustment modules and a control apparatus. An input/output port of each level of optical power adjustment module may be split into a plurality of groups of input/output ports in pairs. Each group of input/output ports correspond to one phase shifter. The control apparatus may adjust each phase shifter, so that output optical power of each group of output ports of each level of optical power adjustment module is the same. Based on a specific design manner, after each level of optical power adjustment module completes adjustment, some optical signals with the same optical power are added. By analogy, after all optical power adjustment modules complete adjustment, it can be ensured that optical power of N optical signals output by the optical power adjustment apparatus is the same. It should be understood that, regardless of a quantity of fundamental-mode optical signals obtained after mode demultiplexing, the foregoing power adjustment manner may be used, so that power of each fundamental-mode optical signal is the same, power adjustment precision is higher, and applicability is wider.

In some possible implementations, the optical power adjustment apparatus includes a first optical power adjustment module and a second optical power adjustment module. The first optical power adjustment module includes a first MMI, a first phase shifter, and a second phase shifter. The second optical power adjustment module includes a second MMI, a third MMI, a third phase shifter, and a fourth phase shifter. A second input port or a third input port of the first MMI is connected to the first phase shifter, a first input port or a fourth input port of the second MMI is connected to the second phase shifter, the first input port of the second MMI is connected to a first output port of the first MMI, a second input port of the second MMI is connected to a second output port of the first MMI, a first input port of the third MMI is connected to a third output port of the first MMI, and a second input port of the third MMI is connected to a fourth output port of the first MMI; and the third phase shifter is connected between the first input port of the second MMI and the first output port of the first MMI or between the second input port of the second MMI and the second output port of the first MMI, and the fourth phase shifter is connected between the first input port of the third MMI and the third output port of the first MMI or between the second input port of the third MMI and the fourth output port of the first MMI.

The control apparatus is configured to adjust the first phase shifter, to enable a phase difference between an optical signal input from the second input port of the first MMI and an optical signal input from the third input port of the first MMI to be 0 or an integer multiple of $2\pi$, and enable output optical power of the second output port of the first MMI to be the same as output optical power of the third output port of the first MMI. The control apparatus is configured to adjust the second phase shifter, to enable a phase difference between an optical signal input from a first input port of the first MMI and an optical signal input from a fourth input port of the first MMI to be 0 or an integer multiple of $2\pi$, and enable output optical power of the first output port of the first MMI to be the same as output optical power of the fourth output port of the first MMI. The control apparatus is configured to adjust the third phase shifter, to enable a phase difference between an optical signal input from the first input port of the second MMI and an optical signal input from the second input port of the second MMI to be 0 or an integer multiple of $2\pi$, and enable output optical power of a first output port of the second MMI to be the same as output optical power of a second output port of the second MMI. The control apparatus is configured to adjust the fourth phase shifter, to enable a phase difference between an optical signal input from the first input port of the third MMI and an optical signal input from the second input port of the third MMI to be 0 or an integer multiple of $2\pi$, and enable output optical power of a first output port of the third MMI to be the same as output optical power of a second output port of the third MMI. In this implementation, a minimum structure for forming an optical power adjustment apparatus is provided, which enhances implementability of this solution.

In some possible implementations, multi-mode interference region lengths of all the MMIs in each optical power adjustment module are all $3L_\pi/2$, and $L_\pi$ is a beat length of each of two lowest-order modes in an MMI waveguide. In this implementation, regardless of a quantity of input/output ports of an N×N MMI, the length of the multi-mode interference region is $3L_\pi/2$. A length of a multi-mode interference region of an N×N optical coupler is $3L_\pi/N$. It can be learned that the N×N MMI provided in this disclosure is different from the N×N optical coupler. The N×N optical coupler can be used only in a scenario in which N input light is non-coherent light. The N×N MMI provided in this disclosure may be applied to a scenario in which a multi-mode optical signal is converted into N coherent single-mode optical signals, thereby enhancing practicability of this solution.

In some possible implementations, multi-mode interference region lengths of MMIs in different optical power adjustment modules are different, thereby improving flexibility of this solution.

In some possible implementations, the $K^{th}$ optical power adjustment module further includes a plurality of beam splitters, and the control apparatus includes M control modules. $2M-K+1$ input ports of each MMI in the $K^{th}$ optical power adjustment module are respectively connected to first output ports of $2M-K+1$ beam splitters, second output ports of the $2M-K+1$ beam splitters are all connected to a $K^{th}$ control module, and the $K^{th}$ control module is electrically connected to each phase shifter in the $K^{th}$ optical power adjustment module. Each beam splitter is configured to split an input optical signal, output one of the split optical signals to an MMI corresponding to the beam splitter, and output another of the split optical signals to the $K^{th}$ control module. The $K^{th}$ control module is configured to detect the input optical signal, and adjust each phase shifter in the $K^{th}$ optical power adjustment module based on a result of the detection. In this implementation, a manner in which a control module detects an optical signal is provided. The control module is specifically configured to detect each optical signal input to the MMI, and then adjust a corresponding phase shifter based on a result of the detection, thereby implementing automatic adjustment.

In some possible implementations, the $K^{th}$ control module includes $2M-K$ couplers, $2M-K$ photodetectors, and $2M-K$ phase control units. The $I^{th}$ input port is connected to a first output port of an $I^{th}$ beam splitter. The $(2M-K+1-I+1)^{th}$ input port is connected to a first output port of a $(2M-K+1-I+1)^{th}$ beam splitter. A second output port of the $I^{th}$ beam splitter and a second output port of the $(2M-K+1-I+1)^{th}$ beam splitter are connected to an input port of a $J^{th}$ coupler, and $1 \leq J \leq 2M-K$. An output port of the $J^{th}$ coupler is connected to an input port a $J^{th}$ optical detector. An output port of the $J^{th}$ photodetector is electrically connected to an input port of the phase control unit. An output port of the phase control unit is electrically connected to each phase shifter in the $K^{th}$ optical power adjustment module. The $J^{th}$ coupler is configured to couple input optical signals. The $J^{th}$ photodetector is configured to detect the coupled optical signal. The phase control unit is configured to adjust an $I^{th}$ phase shifter in the $K^{th}$ optical power adjustment module based on a detection result of the $J^{th}$ photodetector. The $I^{th}$ phase shifter is connected to the $I^{th}$ input port or the $(2M-K+1-I+1)^{th}$ input port. In this implementation, a specific structure of a control module is provided. If two optical signals input to an MMI are in a same phase, constructive interference occurs. In this case, optical power detected by a photodetector is the largest. Based on this principle, a phase shifter is adjusted, so that a phase difference between the two optical signals input to the MMI is 0 or an integer multiple of $2\pi$, thereby improving practical value of this solution.

In some possible implementations, the $K^{th}$ optical power adjustment module further includes a plurality of beam splitters, and the control apparatus includes M control modules. $2M-K+1$ output ports of each MMI in the $K^{th}$ optical power adjustment module are respectively connected to input ports of $2M-K+1$ beam splitters, first output ports of the $2M-K+1$ beam splitters are connected to input ports of $2K$ MMIs in a $(K+1)^{th}$ optical power adjustment module, second output ports of the $2M-K+1$ beam splitters are all connected to a $K^{th}$ control module, and the $K^{th}$ control module is electrically connected to each phase shifter in the $K^{th}$ optical power adjustment module. Each splitter is configured to split an input optical signal. One of the split optical signals is output to an MMI corresponding to the beam splitter in the $(K+1)^{th}$ optical power adjustment module, and another of the split optical signals is output to the $K^{th}$ control module. The $K^{th}$ control module is configured to detect the input optical signal, and adjust each phase shifter in the $K^{th}$ optical power adjustment module based on a result of the detection. In this implementation, another manner in which a control module detects an optical signal is provided. The control module is specifically configured to detect each optical signal output by an MMI, and then adjust a corresponding phase shifter based on a result of the detection, thereby implementing automatic adjustment and enhancing flexibility of this solution.

In some possible implementations, the $K^{th}$ control module includes 2M–K+1 photodetectors, and 2M–K phase control units. Second output ports of the 2M–K+1 beam splitters are connected to input ports of the 2M–K+1 photodetectors, output ports of the 2M–K+1 photodetectors are all electrically connected to an input port of the phase control unit, and an output port of the phase control unit is electrically connected to each phase shifter in the $K^{th}$ optical power adjustment module. An $I^{th}$ photodetector is configured to detect an input optical signal, where an input port of the $I^{th}$ photodetector is connected to a second output port of an $I^{th}$ beam splitter. A $(2M–K+1–I+1)^{th}$ photodetector is configured to detect an input optical signal, where an input port of the $(2M–K+1–I+1)^{th}$ photodetector is connected to a second output port of a $(2M–K+1–I+1)^{th}$ beam splitter. The phase control unit is configured to adjust an $I^{th}$ phase shifter in the $K^{th}$ optical power adjustment module based on detection results of the $I^{th}$ photodetector and the $(2M–K+1–I+1)^{th}$ photodetector. The $I^{th}$ phase shifter is connected to the $I^{th}$ input port or the $(2M–K+1–I+1)^{th}$ input port. Each photodetector is configured to detect an input optical signal. The phase control unit is configured to adjust each phase shifter in the $K^{th}$ optical power adjustment module based on a detection result of each photodetector. In this implementation, a specific structure of a control module is provided. If power of two optical signals output by an MMI is the same, a difference value in optical power detected by two photodetectors is the smallest. Based on this principle, a phase shifter is adjusted, so that the power of the two optical signals output by the MMI is the same. Different from the foregoing implementation of adjusting the phase shifter based on the constructive interference principle, the implementation of this solution is extended.

In some possible implementations, the multi-mode light source is a multi-mode pump light source, and an optical signal output by the optical power adjustment apparatus is for injection to an erbium-doped fiber. This disclosure may be specifically applied to an EDFA, and the optical power adjustment system is easy to be integrated and has low costs.

In some possible implementations, the mode demultiplexer may be a demultiplexer in a fiber form, for example, a photonic lantern. Alternatively, the mode demultiplexer may be a demultiplexer in a waveguide form, for example, a demultiplexer of a planar optical waveguide (PLC) and a silicon optical mode demultiplexer. Alternatively, the mode demultiplexer may be a demultiplexer in a spatial form, for example, a spatial optical mode demultiplexer based on a phase mask template, improving expansibility of this solution.

In some possible implementations, an output port of the multi-mode light source is connected to an input port of the mode demultiplexer through a multi-mode fiber, and an output port of the mode demultiplexer is connected to an input port of the optical power adjustment apparatus through N single-mode fibers or N waveguides, enriching the implementations of this solution.

According to a second aspect, this disclosure provides an optical power adjustment apparatus. The optical power adjustment apparatus includes M optical power adjustment modules and a control apparatus, and M is an integer greater than 1. Each optical power adjustment module includes a plurality of phase shifters, and the control apparatus is electrically connected to the M optical power adjustment modules. The M optical power adjustment modules are sequentially arranged from an input port of the optical power adjustment apparatus to an output port of the optical power adjustment apparatus, and the M optical power adjustment modules are connected together in series. A $K^{th}$ optical power adjustment module in the optical power adjustment apparatus includes 2K–1 multi-mode interferometers MMIs. Each MMI includes 2M–K+1 input ports and 2M–K+1 output ports, and $1≤K≤M$. An $I^{th}$ input port or a $(2M–K+1–I+1)^{th}$ input port in the 2M–K+1 input ports is connected to one phase shifter, and $1≤I≤2M–K+1$. The control apparatus is configured to adjust the phase shifters in the $K^{th}$ optical power adjustment module, to enable a phase difference between an optical signal input from the $I^{th}$ input port of each MMI in the $K^{th}$ optical power adjustment module and an optical signal input from the $(2M–K+1–I+1)$th input port of the MMI to be 0 or an integer multiple of $2\pi$. In this way, output optical power of the $I^{th}$ output port of each MMI in the $K^{th}$ optical power adjustment module may be the same as output optical power of the $(2M–K+1–I+1)^{th}$ output port of the MMI.

In some possible implementations, the optical power adjustment apparatus includes a first optical power adjustment module and a second optical power adjustment module. The first optical power adjustment module includes a first MMI, a first phase shifter, and a second phase shifter. The second optical power adjustment module includes a second MMI, a third MMI, a third phase shifter, and a fourth phase shifter. A second input port or a third input port of the first MMI is connected to the first phase shifter, a first input port or a fourth input port of the second MMI is connected to the second phase shifter, the first input port of the second MMI is connected to a first output port of the first MMI, a second input port of the second MMI is connected to a second output port of the first MMI, a first input port of the third MMI is connected to a third output port of the first MMI, and a second input port of the third MMI is connected to a fourth output port of the first MMI; and the third phase shifter is connected between the first input port of the second MMI and the first output port of the first MMI or between the second input port of the second MMI and the second output port of the first MMI, and the fourth phase shifter is connected between the first input port of the third MMI and the third output port of the first MMI or between the second input port of the third MMI and the fourth output port of the first MMI.

The control apparatus is configured to adjust the first phase shifter, to enable a phase difference between an optical signal input from the second input port of the first MMI and an optical signal input from the third input port of the first MMI to be 0 or an integer multiple of $2\pi$, and enable output optical power of the second output port of the first MMI to be the same as output optical power of the third output port of the first MMI. The control apparatus is configured to adjust the second phase shifter, to enable a phase difference between an optical signal input from a first input port of the first MMI and an optical signal input from a fourth input port of the first MMI to be 0 or an integer multiple of $2\pi$, and enable output optical power of the first output port of the first MMI to be the same as output optical power of the fourth output port of the first MMI. The control apparatus is configured to adjust the third phase shifter, to enable a phase difference between an optical signal input from the first input port of the second MMI and an optical signal input from the second input port of the second MMI to be 0 or an integer multiple of $2\pi$, and enable output optical power of a first output port of the second MMI to be the same as output optical power of a second output port of the second MMI. The control apparatus is configured to adjust the fourth phase shifter, to enable a phase difference between an optical signal input from the first input port of the third MMI and an optical signal input from the second input port of the third MMI to be 0 or an integer multiple of $2\pi$, and enable output optical power of a first output port of the third MMI to be the same as output optical power of a second output port of the third MMI. In this implementation, a minimum structure for forming an optical power adjustment apparatus is provided, which enhances implementability of this solution.

In some possible implementations, multi-mode interference region lengths of all the MMIs in each optical power adjustment module are all $3L_\pi/2$, and $L_\pi$ is a beat length of each of two lowest-order modes in an MMI waveguide. In this implementation, regardless of a quantity of input/output ports of an N×N MMI, the length of the multi-mode interference region is $3L_\pi/2$. A length of a multi-mode interference region of an N×N optical coupler is $3L_\pi/N$. It can be learned that the N×N MMI provided in this disclosure is different from the N×N optical coupler. The N×N optical coupler can be used only in a scenario in which N input light is non-coherent light. The N×N MMI provided in this disclosure may be applied to a scenario in which a multi-mode optical signal is converted into N coherent single-mode optical signals, thereby enhancing practicability of this solution.

In some possible implementations, multi-mode interference region lengths of MMIs in different optical power adjustment modules are different, thereby improving flexibility of this solution.

In some possible implementations, the $K^{th}$ optical power adjustment module further includes a plurality of beam splitters, and the control apparatus includes M control modules. $2M-K+1$ input ports of each MMI in the $K^{th}$ optical power adjustment module are respectively connected to first output ports of $2M-K+1$ beam splitters, second output ports of the $2M-K+1$ beam splitters are all connected to a $K^{th}$ control module, and the $K^{th}$ control module is electrically connected to each phase shifter in the $K^{th}$ optical power adjustment module. Each beam splitter is configured to split an input optical signal, output one of the split optical signals to an MMI corresponding to the beam splitter, and output another of the split optical signals to the $K^{th}$ control module. The $K^{th}$ control module is configured to detect the input optical signal, and adjust each phase shifter in the $K^{th}$ optical power adjustment module based on a result of the detection. In this implementation, a manner in which a control module detects an optical signal is provided. The control module is specifically configured to detect each optical signal input to the MMI, and then adjust a corresponding phase shifter based on a result of the detection, thereby implementing automatic adjustment.

In some possible implementations, the $K^{th}$ control module includes $2M-K$ couplers, $2M-K$ photodetectors, and $2M-K$ phase control units. The $I^{th}$ input port is connected to a first output port of an $I^{th}$ beam splitter. The $(2M-K+1-I+1)^{th}$ input port is connected to a first output port of a $(2M-K+1-I+1)^{th}$ beam splitter. A second output port of the $I^{th}$ beam splitter and a second output port of the $(2M-K+1-I+1)^{th}$ beam splitter are connected to an input port of a $J^{th}$ coupler, and $1 \leq J \leq 2M-K$. An output port of the $J^{th}$ coupler is connected to an input port a $J^{th}$ optical detector. An output port of the $J^{th}$ photodetector is electrically connected to an input port of the phase control unit. An output port of the phase control unit is electrically connected to each phase shifter in the $K^{th}$ optical power adjustment module. The $J^{th}$ coupler is configured to couple input optical signals. The $J^{th}$ photodetector is configured to detect the coupled optical signal. The phase control unit is configured to adjust an $I^{th}$ phase shifter in the $K^{th}$ optical power adjustment module based on a detection result of the $J^{th}$ photodetector. The $I^{th}$ phase shifter is connected to the $I^{th}$ input port or the $(2M-K+1-I+1)^{th}$ input port. In this implementation, a specific structure of a control module is provided. If two optical signals input to an MMI are in a same phase, constructive interference occurs. In this case, optical power detected by a photodetector is the largest. Based on this principle, a phase shifter is adjusted, so that a phase difference between the two optical signals input to the MMI is 0 or an integer multiple of $2\pi$, thereby improving practical value of this solution.

In some possible implementations, the $K^{th}$ optical power adjustment module further includes a plurality of beam splitters, and the control apparatus includes M control modules. $2M-K+1$ output ports of each MMI in the $K^{th}$ optical power adjustment module are respectively connected to input ports of $2M-K+1$ beam splitters, first output ports of the $2M-K+1$ beam splitters are connected to input ports of $2K$ MMIs in a $(K+1)^{th}$ optical power adjustment module, second output ports of the $2M-K+1$ beam splitters are all connected to a $K^{th}$ control module, and the $K^{th}$ control module is electrically connected to each phase shifter in the $K^{th}$ optical power adjustment module. Each splitter is configured to split an input optical signal. One of the split optical signals is output to an MMI corresponding to the beam splitter in the $(K+1)^{th}$ optical power adjustment module, and another of the split optical signals is output to the $K^{th}$ control module. The $K^{th}$ control module is configured to detect the input optical signal, and adjust each phase shifter in the $K^{th}$ optical power adjustment module based on a result of the detection. In this implementation, another manner in which a control module detects an optical signal is provided. The control module is specifically configured to detect each optical signal output by an MMI, and then adjust a corresponding phase shifter based on a result of the detection, thereby implementing automatic adjustment and enhancing flexibility of this solution.

In some possible implementations, the $K^{th}$ control module includes $2M-K+1$ photodetectors, and $2M-K$ phase control units. Second output ports of the $2M-K+1$ beam splitters are connected to input ports of the $2M-K+1$ photodetectors, output ports of the $2M-K+1$ photodetectors are all electrically connected to an input port of the phase control unit, and an output port of the phase control unit is electrically connected to each phase shifter in the $K^{th}$ optical power adjustment module. An $I^{th}$ photodetector is configured to detect an input optical signal, where an input port of the $I^{th}$ photodetector is connected to a second output port of an $I^{th}$ beam splitter. A $(2M-K+1-I+1)^{th}$ photodetector is configured to detect an input optical signal, where an input port of the $(2M-K+1-I+1)^{th}$ photodetector is connected to a second output port of a $(2M-K+1-I+1)^{th}$ beam splitter. The phase control unit is configured to adjust an $I^{th}$ phase shifter in the $K^{th}$ optical power adjustment module based on detection results of the $I^{th}$ photodetector and the $(2M-K+1-I+1)^{th}$ photodetector. The $I^{th}$ phase shifter is connected to the $I^{th}$ input port or the $(2M-K+1-I+1)^{th}$ input port. Each photodetector is configured to detect an input optical signal. The phase control unit is configured to adjust each phase shifter in the $K^{th}$ optical power adjustment module based on a detection result of each photodetector. In this implementation, a specific structure of a control module is provided. If power of two optical signals output by an MMI is the same, a difference value in optical power detected by two photodetectors is the smallest. Based on this principle, a phase shifter is adjusted, so that the power of the two optical signals output by the MMI is the same. Different from the foregoing implementation of adjusting the phase shifter based on the constructive interference principle, the implementation of this solution is extended.

Embodiments of this disclosure provide an optical power adjustment system. A mode demultiplexer may convert N transverse-mode optical signals output by a multi-mode light source into N fundamental-mode optical signals. Then, the N fundamental-mode optical signals are input to an optical power adjustment apparatus. The optical power adjustment apparatus includes a plurality of levels of optical power adjustment modules and a control apparatus. An input/output port of each level of optical power adjustment module may be split into a plurality of groups of input/output ports in pairs. Each group of input/output ports correspond to one phase shifter. The control apparatus may adjust each phase shifter, so that output optical power of each group of output ports of each level of optical power adjustment module is the same. Based on a specific design manner, after each level of optical power adjustment module completes adjustment, some optical signals with the same optical power are added. By analogy, after all optical power adjustment modules complete adjustment, it can be ensured that optical power of N optical signals output by the optical power adjustment apparatus is the same. It should be understood that, regardless of a quantity of fundamental-mode optical signals obtained after mode demultiplexing, the foregoing power adjustment manner may be used, so that power of each fundamental-mode optical signal is the same, power adjustment precision is higher, and applicability is wider.

DESCRIPTION OF EMBODIMENTS

Embodiments of this disclosure provide an optical power adjustment system and an optical power adjustment apparatus. A mode demultiplexer may convert N transverse-mode optical signals output by a multi-mode light source into N fundamental-mode optical signals. By using the optical power adjustment apparatus, power of each fundamental-mode optical signal can be the same, power adjustment precision is higher, and applicability is wider.

It should be noted that in the specification, claims, and accompanying drawings of this disclosure, the terms "first", "second", "third", "fourth", and the like are intended to distinguish between similar objects but do not limit a specific order or sequence. It should be understood that the foregoing terms are interchangeable in proper cases, so that embodiments described in this disclosure can be implemented in a sequence other than the content described in this disclosure. In addition, the terms "include", "have", and any other variant thereof are intended to cover a non-exclusive inclusion. For example, a process, a method, a system, a product, or a device that includes a series of steps or units is not necessarily limited to those steps or units that are clearly listed, but may include other steps or units that are not clearly listed or inherent to these processes, methods, products, or devices.

The optical power adjustment system provided in this disclosure is mainly applied to a scenario in which power equalization is performed on a plurality of single-mode optical signals after a multi-mode optical signal is demultiplexed into the plurality of single-mode optical signals. As an example, the optical power adjustment system may be specifically applied to an EDFA). A pump light source is an indispensable part of the EDFA. The magnitude of pump light power affects the gain of the erbium-doped fiber amplifier. Generally, a single-mode pump light source is expensive, while a multi-mode pump light source is cheap. However, because light output by the multi-mode pump light source has a plurality of transverse modes, the light cannot be directly applied to the EDFA. Generally, the light needs to be mode demultiplexed into a plurality of single-mode light before being output. In addition, power equalization needs to be performed on a plurality of single-mode optical signals, to provide a plurality of single-mode optical signals with approximate or same power for a plurality of EDFAs.

Therefore, this disclosure provides an optical power adjustment system, configured to make power of each fundamental-mode optical signal be the same by adjustment. The following describes the optical power adjustment system provided in this disclosure. It should be noted that in the following accompanying drawings, solid lines represent transmission paths of optical signals, and dashed lines represent transmission paths of electrical signals.

Figure 1:
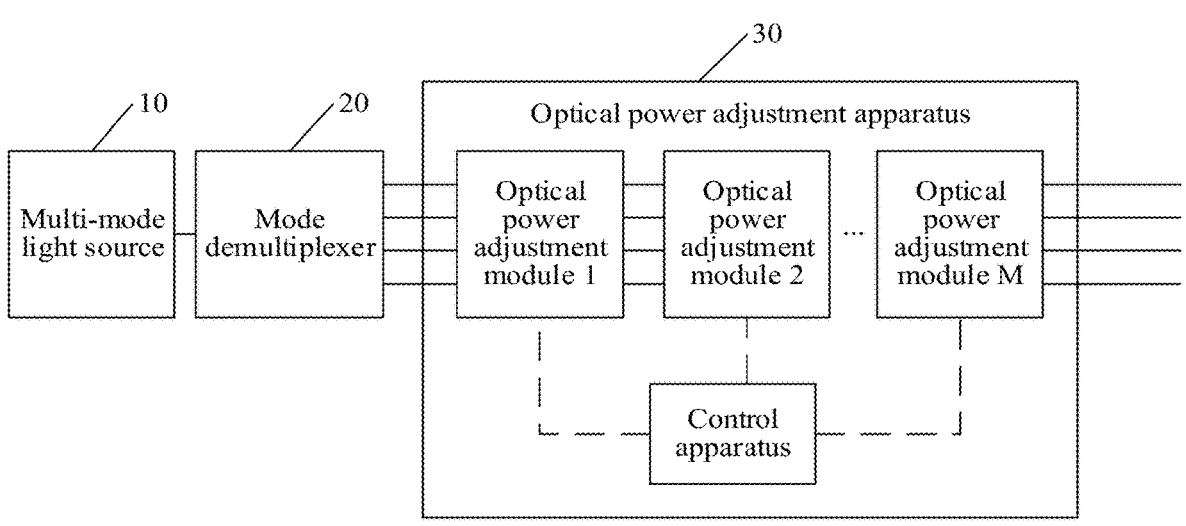
FIG. 1 is a schematic structural diagram of an optical power adjustment system according to an embodiment of this disclosure.

FIG. 1 is a schematic structural diagram of an optical power adjustment system according to an embodiment of this disclosure. As shown in FIG. 1, the optical power adjustment system includes: a multi-mode light source 10, a mode demultiplexer 20, and an optical power adjustment apparatus 30. An output port of the multi-mode light source 10 is connected to an input port of the mode demultiplexer 20, and an output port of the mode demultiplexer 20 is connected to an input port of the optical power adjustment apparatus 30. The optical power adjustment apparatus includes M optical power adjustment modules and a control apparatus. The M optical power adjustment modules are sequentially arranged from the input port of the optical power adjustment apparatus to an output port of the optical power adjustment apparatus, and the M optical power adjustment modules are connected together in series, where M is an integer greater than 1. The control apparatus is electrically connected to the M optical power adjustment modules. Specifically, the multi-mode light source 10 is configured to output a multi-mode optical signal, where the multi-mode optical signal includes N transverse-mode optical signals, and N=2M. It should be understood that a light field output by the multi-mode light source 10 has both a plurality of transverse modes and a plurality of longitudinal modes, and the plurality of longitudinal modes have little impact on the pumping of an EDFA. However, the EDFA uses a single-mode erbium-doped fiber, which cannot support a high-order transverse mode. The plurality of transverse modes cause a waste of pump optical power. Therefore, the N transverse-mode optical signals need to be converted into N fundamental-mode optical signals by the mode demultiplexer 20, and the N fundamental-mode optical signals need to be output to the optical power adjustment apparatus 30. Further, after power adjustment by the optical power adjustment apparatus 30, power of N optical signals output by the optical power adjustment apparatus 30 is the same. It should be understood that, in an actual application, the power of the N optical signals output by the optical power adjustment apparatus 30 may be considered as the same as long as the power is within an acceptable error range.

It should be noted that the multi-mode light source 10 may be specifically a multi-mode pump light source, and the multi-mode light source 10 is connected to the mode demultiplexer 20 through a multi-mode fiber. The N optical signals output by the optical power adjustment apparatus 30 are respectively for injection to corresponding erbium-doped fibers. The mode demultiplexer 20 may be a demultiplexer in a fiber form, for example, a photonic lantern. Alternatively, the mode demultiplexer 20 may be a demultiplexer in a waveguide form, for example, a demultiplexer of a PLC and a silicon optical mode demultiplexer. Alternatively, the mode demultiplexer 20 may be a demultiplexer in a spatial form, for example, a spatial optical mode demultiplexer based on a phase mask template. It should be understood that, if the mode demultiplexer 20 is a demultiplexer in a fiber form, the mode demultiplexer 20 is connected to the optical power adjustment apparatus 30 through N single-mode fibers, and the M optical power adjustment modules in the optical power adjustment apparatus 30 are also connected together in series through the fibers. If the mode demultiplexer 20 is a demultiplexer in a waveguide form, the mode demultiplexer 20 is connected to the optical power adjustment apparatus 30 by N waveguides, and the M optical power adjustment modules in the optical power adjustment apparatus 30 are also connected together in series through the waveguides.

Figure 2:
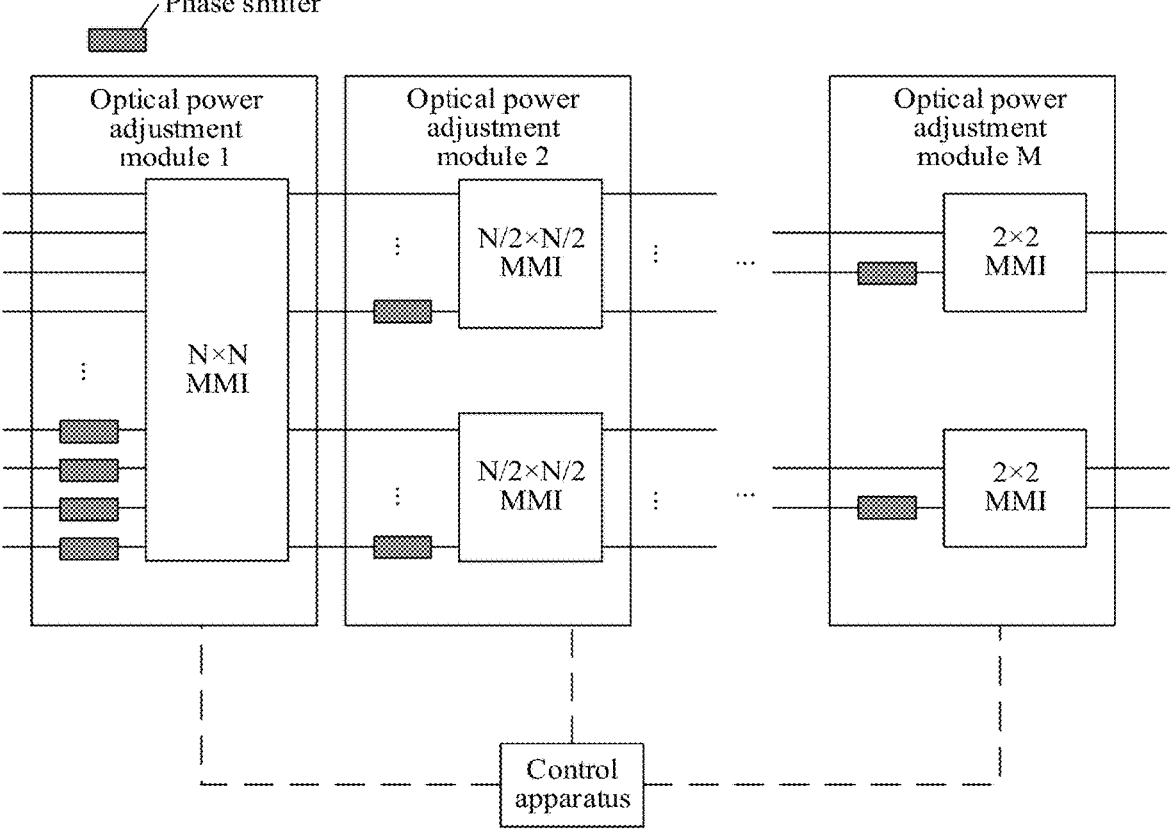
FIG. 2 is a schematic structural diagram of an optical power adjustment apparatus according to an embodiment of this disclosure.

The following describes a specific power adjustment manner with reference to a structure of the optical power adjustment apparatus 30. FIG. 2 is a schematic structural diagram of an optical power adjustment apparatus according to an embodiment of this disclosure. As shown in FIG. 2, each optical power adjustment module includes at least one MMI and a plurality of phase shifters. A quantity of MMIs and a quantity of phase shifters in each optical power adjustment module are determined by a sequence of the optical power adjustment modules. An input port of a first optical power adjustment module is an input port of the optical power adjustment apparatus 30, and an output port of an $M^{th}$ optical power adjustment module is an output port of the optical power adjustment apparatus 30. Specifically, a $K^{th}$ optical power adjustment module includes 2K−1 multi-mode interferometers MMIs, and each MMI includes 2M−K+1 input ports and 2M−K+1 output ports, where $1 \le K \le M$. An $I^{th}$ input port or a $(2M−K+1−I+1)^{th}$ input port in the 2M−K+1 input ports is connected to one phase shifter, where $1 \le I \le 2M−K+1$. A control apparatus adjusts each phase shifter in the $K^{th}$ optical power adjustment module, to enable a phase difference between an optical signal input from the $I^{th}$ input port of each MMI in the $K^{th}$ optical power adjustment module and an optical signal input from the (2M−K+1−I+1)th input port of the MMI to be 0 or an integer multiple of $2\pi$. Further, output optical power of the $I^{th}$ output port of each MMI in the $K^{th}$ optical power adjustment module may be the same as output optical power of the $(2M−K+1−I+1)^{th}$ output port of the MMI. Each optical power adjustment module performs power adjustment in the foregoing manner, so that it can be ensured that optical power of N optical signals output by the $M^{th}$ optical power adjustment modules is the same.

It should be noted that multi-mode interference region lengths of all the MMIs in each optical power adjustment module are all $3L_\pi/2$, and $L_\pi$ is a beat length of each of two lowest-order modes in an MMI waveguide. In addition, multi-mode interference region lengths of MMIs in different optical power adjustment modules are different.

Figure 3:
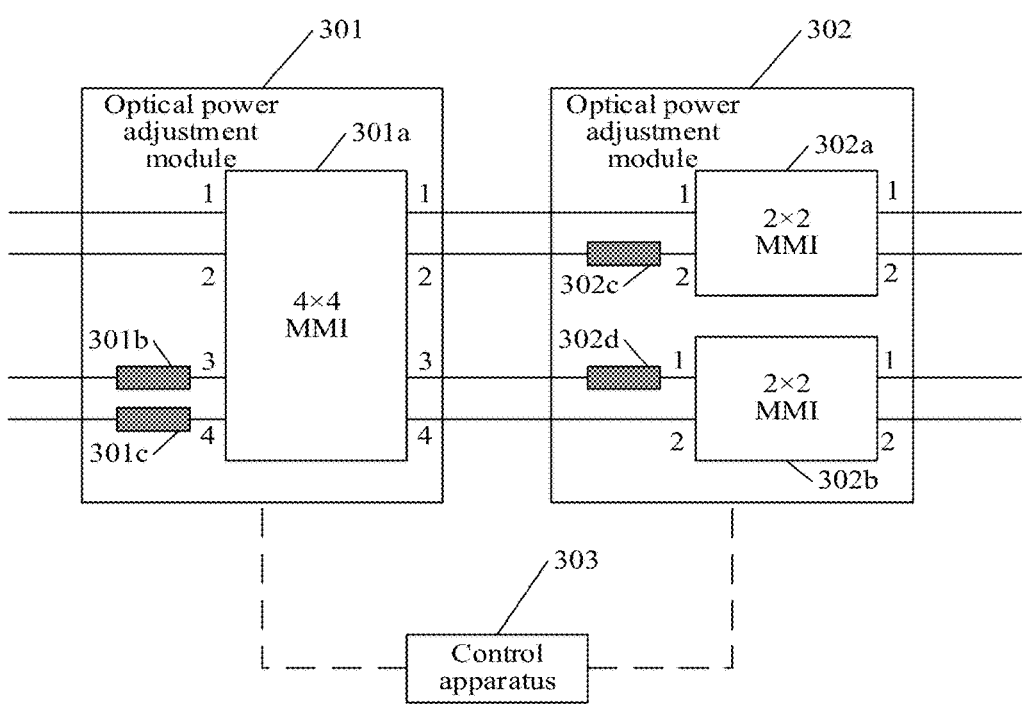
FIG. 3 is another schematic structural diagram of an optical power adjustment apparatus according to an embodiment of this disclosure.

The following further describes a specific power adjustment manner by taking a minimum structure that can be supported by the optical power adjustment apparatus as an example. FIG. 3 is another schematic structural diagram of an optical power adjustment apparatus according to an embodiment of this disclosure. As shown in FIG. 3, the optical power adjustment apparatus 30 includes an optical power adjustment module 301, an optical power adjustment module 302, and a control apparatus 303. The optical power adjustment module 301 includes a 4×4 MMI 301a, a phase shifter 301b, and a phase shifter 301c. The optical power adjustment module 302 includes a 2×2 MMI 302a, a 2×2 MMI 302b, a phase shifter 301c, and a phase shifter 301d. It should be understood that locations of the phase shifters shown in FIG. 3 are merely an example. Specifically, an input port 1 or an input port 4 of the MMI 301a is configured to be connected to the phase shifter 301c, and an input port 2 or an input port 3 of the MMI 301a is configured to be connected to the phase shifter 301b. An input port 1 or an input port 2 of the MMI 302a is configured to be connected to a phase shifter 302c. An input port 1 or an input port 2 of the MMI 302b is configured to be connected to a phase shifter 302d. The control apparatus 303 adjusts the phase shifter 301b, to enable a phase difference between an optical signal input from the input port 2 of the MMI 301a and an optical signal input from the input port 3 of the MMI to be 0 or an integer multiple of $2\pi$, and enable output optical power of an output port 2 of the MMI 301a to be the same as output optical power of an output port 3 of the MMI. The control apparatus 303 adjusts the phase shifter 301c, to enable a phase difference between an optical signal input from the input port 1 of the MMI 301a and an optical signal input from the input port 4 of the MMI to be 0 or an integer multiple of $2\pi$, and enable output optical power of an output port 1 of the MMI 301a to be the same as output optical power of an output port 4 of the MMI. The control apparatus 303 adjusts the phase shifter 302c, to enable a phase difference between an optical signal input from the input port 1 of the MMI 302*a* and an optical signal input from the input port 2 of the MMI to be 0 or an integer multiple of $2\pi$, and enable output optical power of an output port 1 of the MMI 302*a* to be the same as output optical power of an output port 2 of the MMI. The control apparatus 303 adjusts the phase shifter 302*d*, to enable a phase difference between an optical signal input from the input port 1 of the MMI 302*b* and an optical signal input from the input port 2 of the MMI to be 0 or an integer multiple of $2\pi$, and enable output optical power of an output port 1 of the MMI 302*b* to be the same as output optical power of an output port 2 of the MMI.

Based on the foregoing description, four optical signals input from the optical power adjustment module 301 may be divided into two groups. After adjustment, in one group, optical power output by the output port 1 is the same as that output by the output port 4, and in the other group, optical power output by the output port 2 is the same as that output by the output port 3. Then, the optical power adjustment module 302 adjusts the optical power of the two groups of optical signals to be consistent, and finally optical power of four optical signals output by the optical power adjustment module 302 is the same. The following describes a principle of using the foregoing design manner.

It is assumed that the four signals input from the input port 1 to the input port 4 of the MMI 301*a* are respectively: $E_1=a$, $E_2=b\exp(j\Delta\varphi_2)$, $E_3=c\exp(j\Delta\varphi_3)$, $E_4=d\exp(j\Delta\varphi_4)$, where a, b, c, and d are optical power of the four inputs respectively, j is an imaginary number, $\Delta\varphi_2$, $\Delta\varphi_3$ and $\Delta\varphi_4$ are phase differences between the optical signals of the input port 2, the input port 3, and the input port 4 and the optical signal of the input port 1 respectively. A phase transfer function from an input port x to an output port y is expressed as:

$$\varphi_{xy} = \varphi_1 - \frac{\pi}{2}(-1)^{x+y+N} +$$
$$\frac{\pi}{4N} \times \left[ x + y - x^2 - y^2 + (-1)^{x+y+N}\left(2xy - x - y + \frac{1}{2}\right) \right] \cdot \varphi_1$$

is a constant phase. When N=4, a transmission matrix of an input/output port is represented as follows:

$$T_{\varphi4C} = \frac{1}{2}\begin{bmatrix} 1 & \exp\left(j\frac{3}{4}\pi\right) & \exp\left(-j\frac{1}{4}\pi\right) & 1 \\ \exp\left(j\frac{3}{4}\pi\right) & 1 & 1 & \exp\left(-j\frac{1}{4}\pi\right) \\ \exp\left(-j\frac{1}{4}\pi\right) & 1 & 1 & \exp\left(j\frac{3}{4}\pi\right) \\ 1 & \exp\left(-j\frac{1}{4}\pi\right) & \exp\left(j\frac{3}{4}\pi\right) & 1 \end{bmatrix}$$

For the 4×4 MMI 301*a*, the transmission matrix of the input/output port is represented as follows:

Light fields of the four output ports of the MMI 301*a* are respectively represented as follows:

$$E_{1out} = \frac{1}{4}\left\{2a\left[1 + \exp\left(-j\frac{1}{4}\pi\right)\right] + 2d\left[1 + \exp\left(j\left(\Delta\varphi_4 + \frac{1}{2}\pi\right)\right)\right]\right\}$$

$$E_{2out} = \frac{1}{4}\left\{2b\left[\exp\left(j(\Delta\varphi_2)\right) + \exp\left(j\left(\Delta\varphi_2 - \frac{1}{2}\pi\right)\right)\right] +$$
$$2c\left[\exp\left(j(\Delta\varphi_3)\right) + \exp\left(j\left(\Delta\varphi_3 + \frac{1}{2}\pi\right)\right)\right]\right\}$$

$$E_{3out} = \frac{1}{4}\left\{2b\left[\exp\left(j(\Delta\varphi_2)\right) + \exp\left(j\left(\Delta\varphi_2 + \frac{1}{2}\pi\right)\right)\right] +$$
$$2c\left[\exp\left(j(\Delta\varphi_3)\right) + \exp\left(j\left(\Delta\varphi_3 - \frac{1}{2}\pi\right)\right)\right]\right\}$$

$$E_{4out} = \frac{1}{4}\left\{2a\left[1 + \exp\left(-j\frac{1}{4}\pi\right)\right] + 2d\left[1 + \exp\left(j\left(\Delta\varphi_4 - \frac{1}{2}\pi\right)\right)\right]\right\}$$

When $\Delta\varphi_4=0$, $\Delta\varphi_2=\Delta\varphi_3$, that is, the phase difference between the optical signal of the input port 1 and the optical signal of the input port 4 is 0 or an integer multiple of $2\pi$, and the phase difference between the optical signal of the input port 2 and the optical signal of the input port 3 is 0 or an integer multiple of $2\pi$, the output optical power of the four output ports of the MMI 301*a* is respectively represented as follows:

$$P_{1out} = |E_{1out}|^2 = \frac{a^2 + d^2}{2}$$

$$P_{2out} = |E_{2out}|^2 = \frac{b^2 + c^2}{2}$$

$$P_{3out} = |E_{3out}|^2 = \frac{b^2 + c^2}{2}$$

$$P_{4out} = |E_{4out}|^2 = \frac{a^2 + d^2}{2}$$

It can be learned from the foregoing formula that, when phases of the optical signals of the input port 1 and the input port 4 of the MMI 301*a* are equal, the output port 1 and the output port 4 implement power equalization on the input port 1 and the input port 4. Similarly, when phases of the optical signals of the input port 2 and the input port 3 are equal, the output port 2 and the output port 3 implement power equalization on the input port 2 and the input port 3.

Next, the output port 1 and the output port 2 of the MMI 301*a* are respectively connected to the input port 1 and the input port 2 of the MMI 302*a*, and the phase shifter 302*c* is adjusted, so that phases of the two optical signals input to the input ports of the MMI 302*a* are the same. A transmission matrix of the MMI 302*a* is as follows:

$$T_{\varphi4} = T_{\varphi4C} \times T_{\varphi4C} = \frac{1}{4}\begin{bmatrix} 2\left[1 + \exp\left(-j\frac{1}{4}\pi\right)\right] & 0 & 0 & 2\left[1 + \exp\left(j\frac{1}{2}\pi\right)\right] \\ 0 & 2\left[1 + \exp\left(-j\frac{1}{4}\pi\right)\right] & 2\left[1 + \exp\left(j\frac{1}{2}\pi\right)\right] & 0 \\ 0 & 2\left[1 + \exp\left(j\frac{1}{2}\pi\right)\right] & 2\left[1 + \exp\left(-j\frac{1}{4}\pi\right)\right] & 0 \\ 2\left[1 + \exp\left(j\frac{1}{2}\pi\right)\right] & 0 & 0 & 2\left[1 + \exp\left(-j\frac{1}{4}\pi\right)\right] \end{bmatrix}$$

$$T_{\varphi 2} = \frac{\sqrt{2}}{2} \begin{bmatrix} 1 & \exp\left(j\frac{1}{2}\pi\right) \\ \exp\left(j\frac{1}{2}\pi\right) & 1 \end{bmatrix}$$

It can be obtained through calculation that output optical power of the output port 1 of the MMI 302a and output optical power of the output port 2 of the MMI are both $$\frac{a^2 + d^2 + b^2 + c^2}{4}.$$

Similarly, output optical power of the output port 1 the MMI 302b and output optical power of the output port 2 of the MMI are both $$\frac{a^2 + d^2 + b^2 + c^2}{4},$$

thereby implementing power equalization of the four optical signals.

It should be noted that, an N×N MMI and an N×N optical coupler used in this disclosure have the following differences. First, the N×N optical coupler can only be used when N input light is non-coherent light. However, in a scenario where a multi-mode optical signal is converted into N single-mode optical signals, the N single-mode optical signals are coherent light. Therefore, the N×N optical coupler cannot be directly used to implement optical power equalization. Second, for the N×N optical coupler, phases of N input optical signals need to be adjusted to be consistent, so that N output optical power is the same. However, because a quantity of N is usually large, absolute phases of the N input optical signals cannot be detected. Therefore, it cannot be ensured that the phases of the N input optical signals are completely consistent via the N×N optical coupler. For the N×N MMI provided in this disclosure, a relative phase difference between two optical signals can be detected, and phases of the two input optical signals in this group can be adjusted to be consistent via the phase shifter. Based on this design idea, optical power equalization of N outputs can be implemented via a plurality of cascaded optical power adjustment modules.

It should be understood that the control apparatus provided in this disclosure may extract a phase difference between two input optical signals, and control the phase shifter to adjust phases of the input optical signals. In other words, the optical power adjustment apparatus provided in this disclosure automatically implements power adjustment without manual control. Specifically, this disclosure provides a plurality of implementations of detecting a phase difference by a control apparatus. The following separately uses the optical power adjustment apparatus shown in FIG. 3 as an example for description.

First Implementation

Figure 4A:
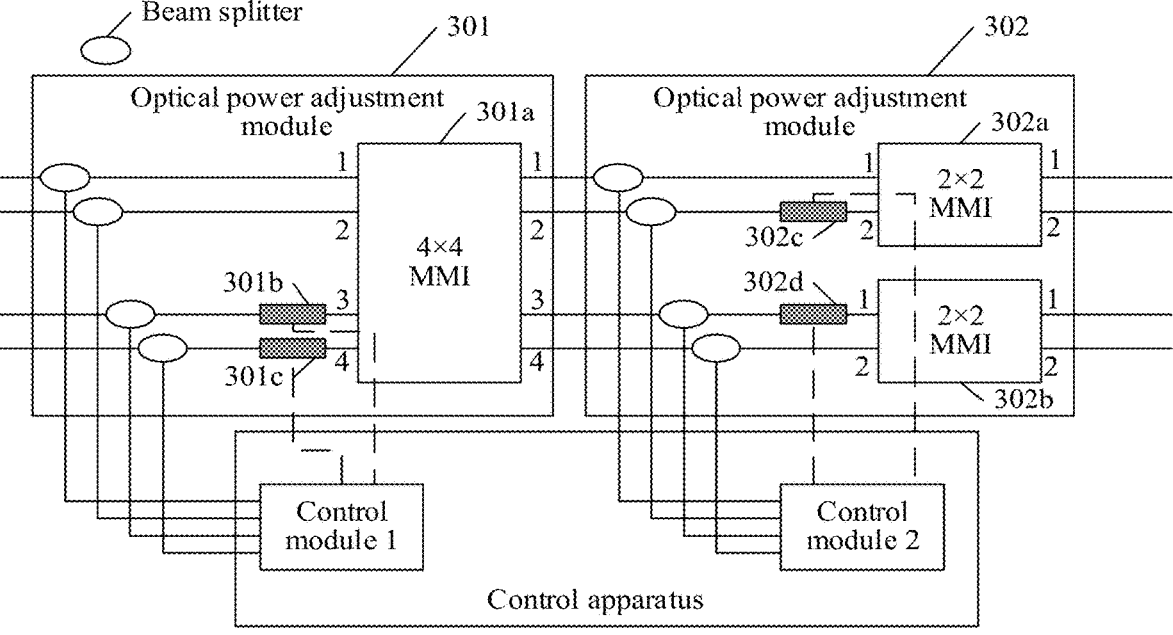
FIG. 4A is another schematic structural diagram of an optical power adjustment apparatus according to an embodiment of this disclosure.

FIG. 4A is another schematic structural diagram of an optical power adjustment apparatus according to an embodiment of this disclosure. As shown in FIG. 4A, the optical power adjustment module 301 and the optical power adjustment module 302 each further include a plurality of beam splitters. The control apparatus 303 includes a control module 1 and a control module 2. The control module 1 is configured to control a phase shifter in the optical power adjustment module 301, and the control module 2 is configured to control a phase shifter in the optical power adjustment module 302. Take the beam splitters in the optical power adjustment module 301 as an example. Each beam splitter is configured to split each optical signal input to the MMI 301a, output one of the split optical signals to the MMI 301a, and output another of the split optical signals to the control module 1. Similarly, the method is also applicable to the beam splitters in the optical power adjustment module 302, and details are not described herein again. It should be noted that a split ratio of each beam splitter is not limited in this disclosure. In an implementation, most split optical signals should be output to a corresponding MMI, and a few split optical signals should be output to a corresponding control module.

Figure 4B:
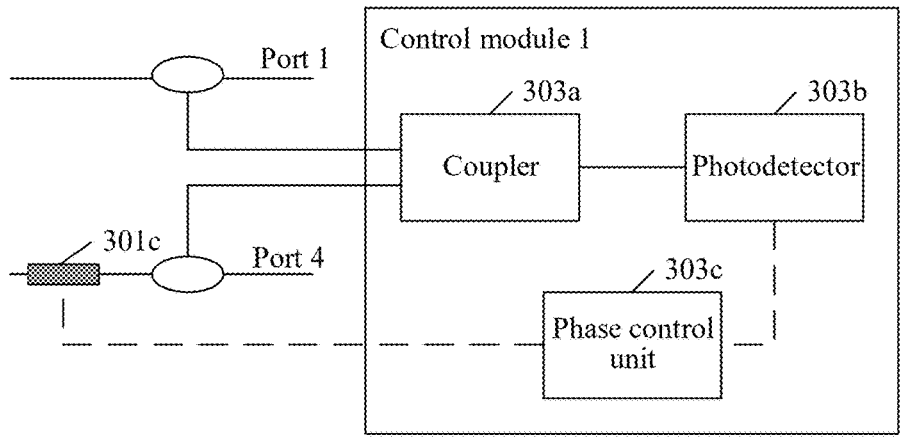
FIG. 4B is a schematic structural diagram of a control module according to an embodiment of this disclosure.

FIG. 4B is a schematic structural diagram of a control module according to an embodiment of this disclosure. As shown in FIG. 4B, the control module 1 includes a coupler 303a, a photodetector 303b, and a phase control unit 303c. The beam splitter connected to the input port 1 of the MMI 301a is further connected to the coupler 303a, and the beam splitter connected to the input port 4 of the MMI 301a is further connected to the coupler 303a. The coupler 303a is configured to couple an input optical signal. The photodetector 303b is configured to detect the coupled optical signal. The phase control unit 303c is configured to adjust the phase shifter 301c based on a detection result output by the photodetector 303b. Specifically, the phase control unit 303c may gradually adjust a voltage output by the phase control unit, to enable a phase value of the phase shifter 301c to be scanned within a range of 0 to 2π. In this process, the photodetector 303b continuously performs power detection on an optical signal output by the coupler 303a. The phase control unit 303c may continuously read a voltage output by the photodetector 303b. It should be understood that, if a phase difference between two optical signals input to the coupler 303a is 0 or an integer multiple of 2π, constructive interference occurs on the two optical signals. In this case, output optical power of the coupler 303a is the largest, and an output voltage of the photodetector 303b is also the largest. The phase control unit 303c may maintain a current output voltage, to enable the phase difference between the two optical signals input to the coupler 303a to be 0 or an integer multiple of 2π. Therefore, output optical power of the output port 1 and output optical power of the output port 4 of the MMI 301a are the same. It should be noted that FIG. 4B shows only a part of the control module 1 corresponding to the phase shifter 301c, and a structure corresponding to the phase shifter 301b is similar to the part shown in FIG. 4B, and details are not described herein again.

Second Implementation

Figure 5A:
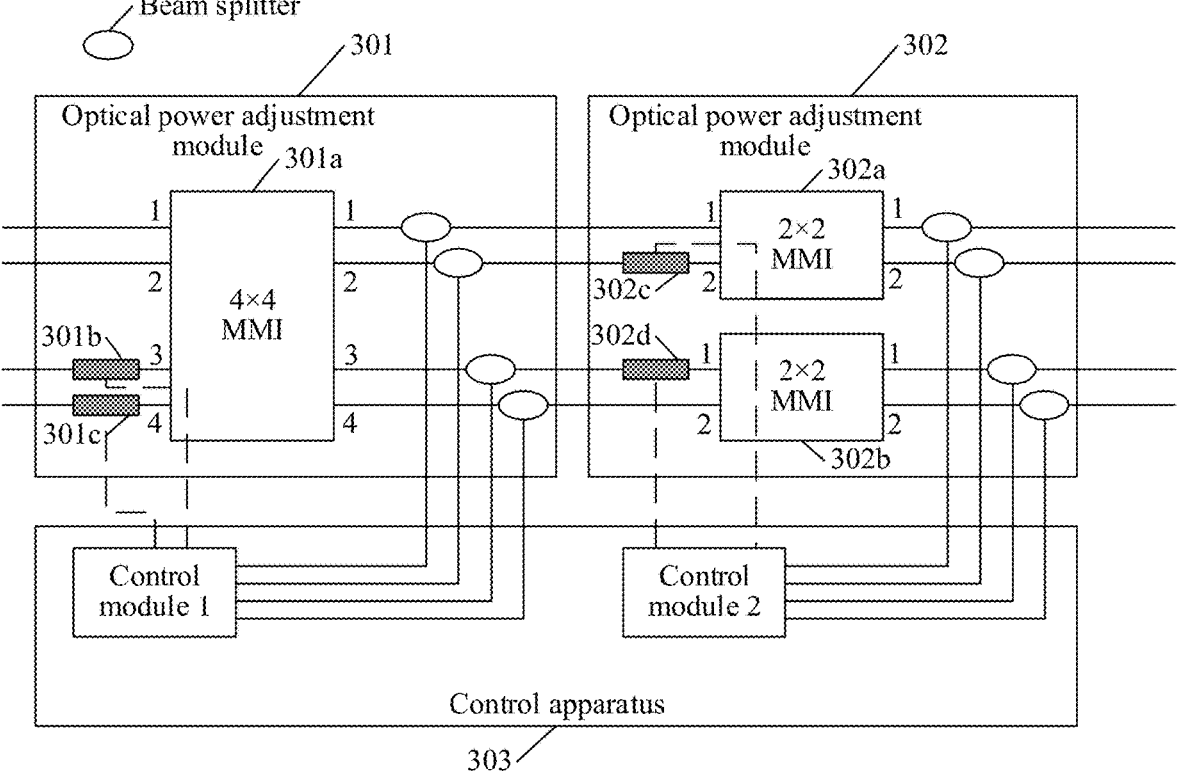
FIG. 5A is another schematic structural diagram of an optical power adjustment apparatus according to an embodiment of this disclosure.

FIG. 5A is another schematic structural diagram of an optical power adjustment apparatus according to an embodiment of this disclosure. As shown in FIG. 5A, the optical power adjustment module 301 and the optical power adjustment module 302 each further include a plurality of beam splitters. The control apparatus 303 includes a control module 1 and a control module 2. The control module 1 is configured to control a phase shifter in the optical power adjustment module 301, and the control module 2 is configured to control a phase shifter in the optical power adjustment module 302. Take the beam splitters in the optical power adjustment module 301 as an example. Each beam splitter is configured to split each optical signal output to the MMI 301a, output one of the split optical signals to the optical power adjustment module 302, and output another of the split optical signals to the control module 1.

Similarly, the method is also applicable to the beam splitters in the optical power adjustment module 302, and details are not described herein again. It should be noted that a split ratio of each beam splitter is not limited in this disclosure. In an implementation, most split optical signals should be output to a corresponding MMI, and a few split optical signals should be output to a corresponding control module.

Figure 5B:
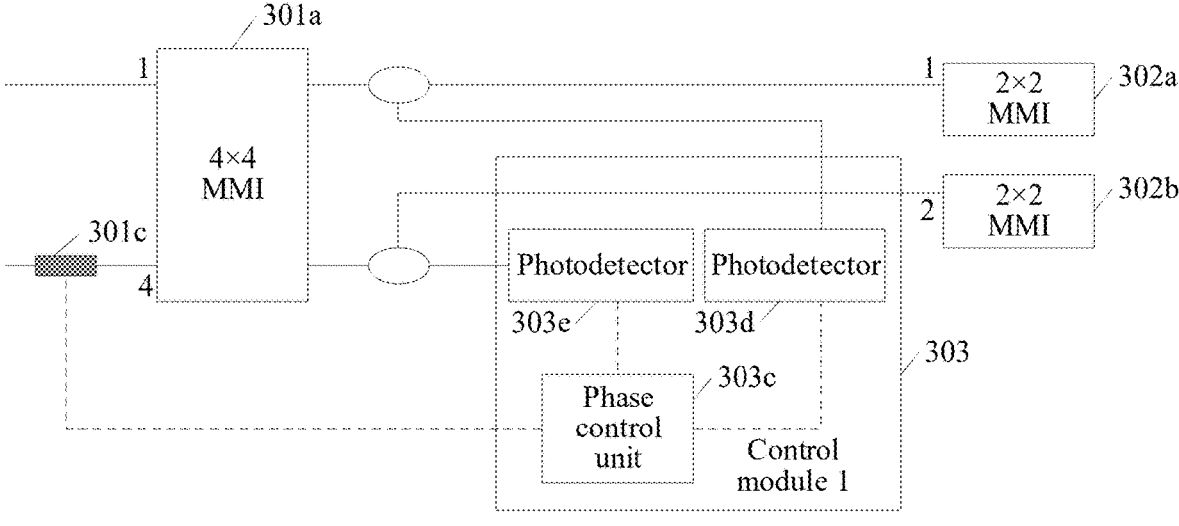
FIG. 5B is another schematic structural diagram of a control module according to an embodiment of this disclosure.

FIG. 5B is another schematic structural diagram of a control module according to an embodiment of this disclosure. As shown in FIG. 5B, the control module 1 includes a photodetector 303*d*, a photodetector 303*e*, and a phase control unit 303*c*. The beam splitter connected to the output port 1 of the MMI 301*a* is further connected to the photodetector 303*d*, and the beam splitter connected to the output port 4 of the MMI 301*a* is further connected to the photodetector 303*e*. The photodetector 303*d* and the photodetector 303*e* are respectively configured to detect optical signals each input from the photodetector 303*d* and the photodetector 303*e*. The phase control unit 303*c* is configured to adjust the phase shifter 301*c* based on detection results output by the photodetector 303*d* and the photodetector 303*e*. Specifically, the phase control unit 303*c* may gradually adjust a voltage output by the phase control unit, to enable a phase value of the phase shifter 301*c* to be scanned within a range of 0 to 2π In this process, the phase control unit 303*c* may continuously read voltages output by the photodetector 303*d* and the photodetector 303*e*, and calculate a difference between two input voltages. It should be understood that, when a voltage difference calculated by the phase control unit 303*c* is the smallest, optical power detected by the photodetector 303*d* and the photodetector 303*e* is the same. In this case, the phase control unit 303*c* may maintain a current output voltage, to enable output optical power of the output port 1 and output optical power of the output port 4 of the MMI 301*a* to be the same. It should be noted that FIG. 5B shows only a part of the control module 1 corresponding to the phase shifter 301*c*, and a structure corresponding to the phase shifter 301*b* is similar to the part shown in FIG. 5B, and details are not described herein again.

Embodiments of this disclosure provide an optical power adjustment system. A mode demultiplexer may convert N transverse-mode optical signals output by a multi-mode light source into N fundamental-mode optical signals. Then, the N fundamental-mode optical signals are input to an optical power adjustment apparatus. The optical power adjustment apparatus includes a plurality of levels of optical power adjustment modules and a control apparatus. An input/output port of each level of optical power adjustment module may be split into a plurality of groups of input/output ports in pairs. Each group of input/output ports correspond to one phase shifter. The control apparatus may adjust each phase shifter, so that output optical power of each group of output ports of each level of optical power adjustment module is the same. Based on a specific design manner, after each level of optical power adjustment module completes adjustment, some optical signals with the same optical power are added. By analogy, after all optical power adjustment modules complete adjustment, it can be ensured that the optical power of the N optical signals output by the optical power adjustment apparatus is the same. It should be understood that, regardless of a quantity of fundamental-mode optical signals obtained after mode demultiplexing, the foregoing power adjustment manner may be used, so that power of each fundamental-mode optical signal is the same, power adjustment precision is higher, and applicability is wider.

Figure 6:
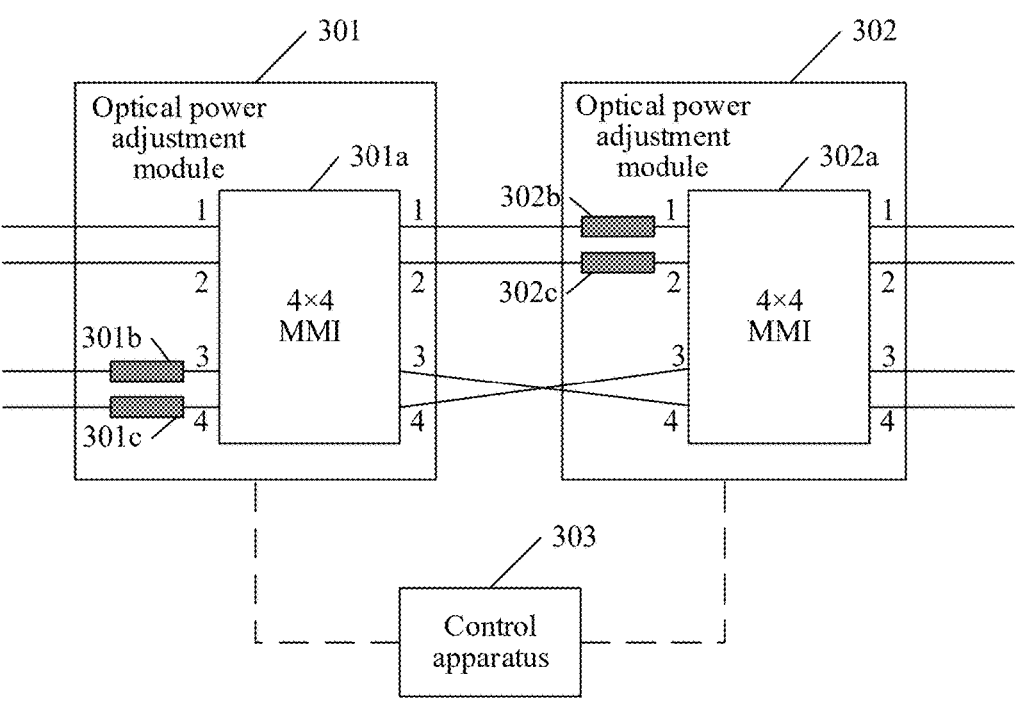
FIG. 6 is another schematic structural diagram of an optical power adjustment apparatus according to an embodiment of this disclosure.

FIG. 6 is another schematic structural diagram of an optical power adjustment apparatus according to an embodiment of this disclosure. As shown in FIG. 6, different from the optical power adjustment apparatus described in the foregoing embodiments, each optical power adjustment module of the optical power adjustment apparatus uses a same N×N MMI. Take N=4 as an example. Both an optical power adjustment module 301 and an optical power adjustment module 302 include only one 4×4 MMI. In addition, an output port of the optical power adjustment module 301 and an input port of the optical power adjustment module 302 are not connected based on port numbers completely, but are partially cross-connected. The optical power adjustment module 301 is similar to the optical power adjustment module 301 in the embodiment shown in FIG. 3, and details are not described herein again. The following mainly describes a structure of the optical power adjustment module 302.

Take FIG. 6 as an example. An output port 1 of an MMI 301*a* is connected to an input port 1 of an MMI 302*a*, an output port 2 of the MMI 301*a* is connected to an input port 2 of the MMI 302*a*, an output port 3 of the MMI 301*a* is connected to an input port 4 of the MMI 302*a*, and an output port 4 of the MMI 301*a* is connected to an input port 3 of the MMI 302*a*. It should be understood that, for the MMI 302*a*, the input port 1 and the input port 4 are input ports in a same group, and the input port 2 and the input port 3 are input ports in a same group. Because the output port 3 and the output port 4 of the MMI 301*a* are cross-connected to the input port 3 and the input port 4 of the MMI 302*a*, input optical power of the input port 1 and input optical power of the input port 3 of the MMI 302*a* are the same, and input optical power of the input port 2 and input optical power of the input port 4 are the same. In this case, the input port 1 or the input port 4 of the MMI 302*a* should be connected to a phase shifter 302*b*, so that output optical power of an output port 1 or an output port 4 of the MMI 302*a* is the same after adjustment. The input port 2 or the input port 3 of the MMI 302*a* should be connected to a phase shifter 302*c*, so that output optical power of an output port 2 or an output port 3 of the MMI 302*a* is the same after adjustment. Finally, output optical power of the four output ports of the MMI 302*a* is the same. A specific power adjustment manner is similar to the manner described in the foregoing embodiment, and details are not described herein again.

It should be noted that, the connection manner shown in FIG. 6 may be understood as a connection manner in which a port 1 and a port 2 are directly connected, and a port 3 and a port 4 are cross-connected. In addition, based on a same design idea, the port 1 and the port 3 may be directly connected, and the port 2 and the port 4 may be cross-connected; or the port 3 and the port 4 are directly connected, and the port 1 and the port 2 are cross-connected; or the port 2 and the port 4 are directly connected, and the port 1 and the port 3 are cross-connected. It should be understood that, based on the design idea of the embodiment shown in FIG. 6, this implementation may also be extended in this disclosure to a scenario in which a quantity of optical power adjustment modules is greater than 2. Details are not described herein again.

It should be noted that embodiments of this disclosure further provide an optical power adjustment apparatus. The optical power adjustment apparatus may be the optical power adjustment apparatus in any one of the embodiments shown in FIG. 1 to FIG. 6. For details, refer to related descriptions of the embodiments shown in FIG. 1 to FIG. 6. Details are not described herein again.

What is claimed is:

1. An optical power adjustment system comprising:

a multi-mode light source comprising a source output port configured to output a multi-mode optical signal, and wherein the multi-mode optical signal comprises N transverse-mode optical signals, and wherein N=2M and M is an integer greater than 1;

a mode demultiplexer configured to convert the N transverse-mode optical signals into N fundamental-mode optical signals, wherein the mode demultiplexer comprises:

a demultiplexer input port coupled to the source output port; and a demultiplexer output port configured to output the N fundamental-mode optical signals; and an optical power adjustment apparatus comprising:

an adjustment input port coupled to the demultiplexer output port;

an adjustment output port;

M optical power adjustment modules, wherein each optical power adjustment module comprises a plurality of phase shifters, wherein the M optical power adjustment modules are sequentially arranged from the adjustment input port to the adjustment output port, wherein the M optical power adjustment modules are coupled together in series, wherein the M optical power adjustment modules comprise a $K^{th}$ optical power adjustment module comprising 2K–1 multi-mode interferometers (MMIs), wherein each MMI comprises 2M–K+1 input ports and 2M–K+1 output ports, wherein 1≤K≤M, wherein an $I^{th}$ input port or a $(2M–K+1–I+1)^{th}$ input port in the 2M–K+1 input ports is coupled to one phase shifter of the phase shifters, and wherein 1≤I≤2M–K+1; and a control apparatus, wherein the control apparatus is electrically coupled to the M optical power adjustment modules, and wherein the control apparatus is configured to adjust the phase shifters in the $K^{th}$ optical power adjustment module to enable a first phase difference between a first optical signal input from the $I^{th}$ input port of each MMI and a second optical signal input from the $(2M–K+1–I+1)^{th}$ input port of the MMI to be 0 or an integer multiple of 2π, and enable a first output optical power of an $I^{th}$ output port of each MMI to be the same as a second output optical power of a $(2M–K+1–I+1)^{th}$ output port of the MMI.

2. The optical power adjustment system according to claim 1, wherein the optical power adjustment apparatus comprises:

a first optical power adjustment module comprising:

a first MMI comprising:

a first MMI first input port;

a first MMI second input port;

a first MMI third input port;

a first MMI fourth input port;

a first MMI first output port;

a first MMI second output port;

a first MMI third output port; and a first MMI fourth output port;

a first phase shifter coupled to the first MMI first input port or the first MMI second input port; and a second phase shifter; and a second optical power adjustment module comprising:

a second MMI comprising:

a second MMI first input port coupled to the first MMI first output port;

a second MMI second input port coupled to the first MMI second output port, wherein the second MMI first input port or the second MMI second input port is coupled to the second phase shifter;

a second MMI first output port; and a second MMI second output port;

a third MMI comprising:

a third MMI first input port coupled to the first MMI third output port;

a third MMI second input port coupled to the first MMI fourth output port;

a third MMI first output port; and a third MMI second output port;

a third phase shifter coupled between the second MMI first input port and the first MMI first output port or between the second MMI second input port and the first MMI second output port; and a fourth phase shifter coupled between the third MMI first input port and the first MMI third output port or between the third MMI second input port and the first MMI fourth output port.

3. The optical power adjustment system according to claim 2, wherein the control apparatus is further configured to:

adjust the first phase shifter to enable a second phase difference between a third optical signal input from the first MMI second input port and a fourth optical signal input from the first MMI third input port to be 0 or an integer multiple of 2π, and enable third output optical power of the first MMI second output port to be the same as fourth output optical power of the first MMI third output port;

adjust the second phase shifter to enable a third phase difference between a fifth optical signal input from the first MMI first input port and a sixth optical signal input from the first MMI fourth input port to be 0 or an integer multiple of 2π, and enable fifth output optical power of the first MMI first output port to be the same as sixth output optical power of the first MMI fourth output port;

adjust the third phase shifter to enable a fourth phase difference between a seventh optical signal input from the second MMI first input port and an eighth optical signal input from the second MMI second input port to be 0 or an integer multiple of 2π, and enable seventh output optical power of the second MMI first output port to be the same as eighth output optical power of the second MMI second output port; and adjust the fourth phase shifter to enable a fifth phase difference between a ninth optical signal input from the third MMI first input port and a tenth optical signal input from the third MMI second input port to be 0 or an integer multiple of 2π, and enable ninth output optical power of the third MMI first output port to be the same as tenth output optical power of the third MMI second output port.

4. The optical power adjustment system according to claim 1, wherein the MMIs in each optical power adjustment module have multi-mode interference region lengths of $3L_{\pi}/2$, and wherein $L_{\pi}$ is a beat length of each of two lowest-order modes in an MMI waveguide of the MMIs.

5. The optical power adjustment system according to claim 4, wherein the multi-mode interference region lengths of the MMIs in different optical power adjustment modules are different.

6. The optical power adjustment system according to claim 1, wherein the $K^{th}$ optical power adjustment module further comprises a plurality of beam splitters each configured to:

split an input optical signal into a plurality of first input optical signals;

output one of the split first input optical signals to an MMI corresponding to one of the beam splitters; and output another of the split first input optical signals to a $K^{th}$ control module from M control modules, wherein 2M–K+1 input ports of each MMI in the $K^{th}$ optical power adjustment module are respectively coupled to first beam splitter output ports of 2M–K+1 beam splitters of the plurality of beam splitters, wherein the control apparatus further comprises the M control modules, wherein second beam splitter output ports of the 2M–K+1 beam splitters are coupled to the $K^{th}$ control module that is electrically coupled to each phase shifter in the $K^{th}$ optical power adjustment module, and wherein the $K^{th}$ control module is configured to:

detect one of the first input optical signals; and adjust each phase shifter in the $K^{th}$ optical power adjustment module based on a result of detecting the one of the first input optical signals.

7. The optical power adjustment system according to claim 6, wherein the $I^{th}$ input port is coupled to a first beam splitter output port of an $I^{th}$ beam splitter, and the $(2M–K+1–I+1)^{th}$ input port is coupled to another first beam splitter output port of a $(2M–K+1–I+1)^{th}$ beam splitter, and wherein the $K^{th}$ control module comprises:

2M–K couplers, wherein a second beam splitter output port of the $I^{th}$ beam splitter and another second beam splitter output port of the $(2M–K+1–I+1)^{th}$ beam splitter are coupled to a coupler input port of a $J^{th}$ coupler of the 2M–K couplers, wherein $1 \le J \le 2M–K$, and wherein the $J^{th}$ coupler is configured to couple input optical signals and obtain a coupled optical signal;

2M–K photodetectors, wherein a coupler output port of the $J^{th}$ coupler is coupled to a photodetector input port of a $J^{th}$ photodetector from the 2M–K photodetectors, and wherein the $J^{th}$ photodetector is configured to detect the coupled optical signal; and 2M–K phase control apparatuses, wherein a photodetector output port of the $J^{th}$ photodetector is electrically coupled to a phase control input port of a phase control apparatus of the 2M–K phase control apparatuses, wherein the phase control apparatus comprises a phase control output port that is electrically coupled to each phase shifter in the $K^{th}$ optical power adjustment module, wherein the phase control apparatus is configured to adjust an $I^{th}$ phase shifter in the $K^{th}$ optical power adjustment module based on a detection result of the $J^{th}$ photodetector, and wherein the $I^{th}$ phase shifter is coupled to the $I^{th}$ input port or the $(2M–K+1–I+1)^{th}$ input port.

8. The optical power adjustment system according to claim 1, wherein the $K^{th}$ optical power adjustment module further comprises a plurality of beam splitters, each configured to:

split an input optical signal into a plurality of first input optical signals;

output one of the split first input optical signals to an MMI corresponding to a beam splitter in the $(K+1)^{th}$ optical power adjustment module; and output another of the split first input optical signals to a $K^{th}$ control module from M control modules, wherein 2M–K+1 output ports of each MMI in the $K^{th}$ optical power adjustment module are respectively coupled to first beam splitter input ports of 2M–K+1 beam splitters of the plurality of beam splitters, wherein the control apparatus comprises the M control modules, and first beam splitter output ports of the 2M–K+1 beam splitters are coupled to MMI input ports of 2K MMIs in the $(K+1)^{th}$ optical power adjustment module, wherein second beam splitter output ports of the 2M–K+1 beam splitters are coupled to the $K^{th}$ control module, and wherein the $K^{th}$ control module is electrically coupled to each phase shifter in the $K^{th}$ optical power adjustment module, and is configured to:

detect one of the first input optical signals; and adjust each phase shifter in the $K^{th}$ optical power adjustment module based on a result of detecting the one of the first input optical signals.

9. The optical power adjustment system according to claim 8, wherein the $K^{th}$ control module comprises:

2M–K+1 photodetectors each configured to detect a corresponding input optical signal, wherein the second beam splitter output ports of the 2M–K+1 beam splitters are coupled to photodetector input ports of the 2M–K+1 photodetectors, wherein an $I^{th}$ photodetector from the 2M–K+1 photodetectors is configured to detect a first input optical signal, wherein a first photodetector input port of the $I^{th}$ photodetector is coupled to a third beam splitter output port of an $I^{th}$ beam splitter from the second beam splitter output ports, wherein a $(2M–K+1–I+1)^{th}$ photodetector from the 2M–K+1 photodetectors is configured to detect a second input optical signal, and wherein a second photodetector input port of the $(2M–K+1–I+1)^{th}$ photodetector is coupled to a third beam splitter output port of a $(2M–K+1–I+1)^{th}$ beam splitter from the second beam splitter output ports; and 2M–K phase control apparatuses, wherein photodetector output ports of the 2M–K+1 photodetectors are electrically coupled to a phase control input port of a phase control apparatus that is configured to adjust each phase shifter in the $K^{th}$ optical power adjustment module based on a detection result of each of the 2M–K+1 photodetectors, wherein the phase control apparatus comprises a phase control output port that is electrically coupled to each phase shifter in the $K^{th}$ optical power adjustment module wherein the phase control apparatus is configured to adjust an $I^{th}$ phase shifter in the $K^{th}$ optical power adjustment module based on detection results of the $I^{th}$ photodetector and the $(2M–K+1–I+1)^{th}$ photodetector, and wherein the $I^{th}$ phase shifter is coupled to the $I^{th}$ input port or the $(2M–K+1–I+1)^{th}$ input port.

10. The optical power adjustment system according to claim 1, wherein the multi-mode light source is a multi-mode pump light source, and wherein the optical power adjustment apparatus is configured to provide an optical signal output for injection to an erbium-doped fiber.

11. The optical power adjustment system according to claim 1, wherein the mode demultiplexer is a photonic lantern, a demultiplexer in a waveguide form, or a demultiplexer in a spatial light form.

12. The optical power adjustment system according to claim 1, wherein the source output port is coupled to the demultiplexer input port through a multi-mode fiber, and wherein the demultiplexer output port is coupled to the adjustment input port through N single-mode fibers or N waveguides.

13. An optical power adjustment apparatus comprising:

an adjustment input port configured to couple to a demultiplexer output port of a mode demultiplexer and to receive N fundamental-mode optical signals from the demultiplexer output port;

an adjustment output port;

M optical power adjustment modules, wherein M is an integer greater than 1 and N=2M, wherein each optical power adjustment module comprises a plurality of phase shifters, wherein the M optical power adjustment modules are sequentially arranged from the adjustment input port to the adjustment output port and are coupled together in series, wherein the M optical power adjustment modules comprise a $K^{th}$ optical power adjustment module comprising 2K−1 multi-mode interferometers (MMIs), wherein each MMI comprises 2M−K+1 input ports and 2M−K+1 output ports, wherein 1≤K≤M, wherein an $I^{th}$ input port or a $(2M-K+1-I+1)^{th}$ input port in the 2M−K+1 input ports is coupled to one phase shifter of the phase shifters, and wherein 1≤I≤2M−K+1; and a control apparatus electrically coupled to the M optical power adjustment modules and configured to adjust the phase shifters in the $K^{th}$ optical power adjustment module to enable a first phase difference between a first optical signal input from the $I^{th}$ input port of each MMI and a second optical signal input from the $(2M-K+1-I+1)^{th}$ input port of the MMI to be 0 or an integer multiple of 2π, and enable first output optical power of an $I^{th}$ output port of each MMI to be the same as second output optical power of a $(2M-K+1-I+1)^{th}$ output port of the MMI.

14. The optical power adjustment apparatus according to claim 13, wherein the optical power adjustment apparatus comprises:

a first optical power adjustment module comprising:
a first MMI comprising:
a first MMI first input port;
a first MMI second input port;
a first MMI third input port;
a first MMI fourth input port;
a first MMI first output port;
a first MMI second output port;
a first MMI third output port; and
a first MMI fourth output port;
a first phase shifter coupled to the first MMI first input port or the first MMI second input port; and
a second phase shifter; and a second optical power adjustment module comprising:
a second MMI comprising:
a second MMI first input port coupled to the first MMI first output port;
a second MMI second input port coupled to the first MMI second output port, wherein the second MMI first input port or the second MMI second input port is coupled to the second phase shifter;
a second MMI first output port; and
a second MMI second output port;
a third MMI comprising:
a third MMI first input port coupled to the first MMI third output port;
a third MMI second input port coupled to the first MMI fourth output port;
a third MMI first output port; and
a third MMI second output port;

a third phase shifter coupled between the second MMI first input port and the first MMI first output port or between the second MMI second input port and the first MMI second output port; and a fourth phase shifter coupled between the third MMI first input port and the first MMI third output port or between the third MMI second input port and the first MMI fourth output port, wherein the control apparatus of the optical power adjustment apparatus is configured to:

adjust the first phase shifter to enable a second phase difference between a third optical signal input from the first MMI second input port and a fourth optical signal input from the first MMI third input port to be 0 or an integer multiple of 2π, and enable third output optical power of the first MMI second output port to be the same as fourth output optical power of the first MMI third output port;

adjust the second phase shifter to enable a third phase difference between a fifth optical signal input from the first MMI first input port and a sixth optical signal input from a fourth input port of the first MMI to be 0 or an integer multiple of 2π, and enable fifth output optical power of the first MMI first output port to be the same as sixth output optical power of the first MMI fourth output port;

adjust the third phase shifter to enable a fourth phase difference between a seventh optical signal input from the second MMI first input port and an eighth optical signal input from the second MMI second input port to be 0 or an integer multiple of 2π, and enable seventh output optical power of the second MMI first output port to be the same as eighth output optical power of the second MMI second output port; and adjust the fourth phase shifter to enable a fifth phase difference between a ninth optical signal input from the third MMI first input port and a tenth optical signal input from the third MMI second input port to be 0 or an integer multiple of 2π, and enable ninth output optical power of the third MMI first output port to be the same as tenth output optical power of the third MMI second output.

15. The optical power adjustment apparatus according to claim 13, wherein the MMIs in each optical power adjustment module have multi-mode interference region lengths of $3L_\pi/2$, and wherein $L_\pi$ is a beat length of each of two lowest-order modes in an MMI waveguide of the MMIs.

16. The optical power adjustment apparatus according to claim 15, wherein the multi-mode interference region lengths of the MMIs in different optical power adjustment modules are different.

17. The optical power adjustment apparatus according to claim 13, wherein the $K^{th}$ optical power adjustment module further comprises a plurality of beam splitters, configured to:

split an input optical signal into a plurality of first input optical signals;

output one of the split first input optical signals to an MMI corresponding to one of the beam splitters; and output another of the split first input optical signals to a $K^{th}$ control module from M control modules, wherein 2M−K+1 input ports of each MMI in the $K^{th}$ optical power adjustment module are respectively coupled to first beam splitter output ports of 2M−K+1 beam splitters of the plurality of beam splitters, wherein the control apparatus comprises the M control modules, wherein second beam splitter output ports of the 2M−K+1 beam splitters are coupled to the $K^{th}$ control module that is electrically coupled to each phase shifter in the $K^{th}$ optical power adjustment module,
and
    wherein the $K^{th}$ control module is configured to:
        detect one of the first input optical signals; and
        adjust each phase shifter in the $K^{th}$ optical power adjustment module based on a result of detecting the one of the first input optical signals.

18. The optical power adjustment apparatus according to claim 17, wherein the $I^{th}$ input port is coupled to a first beam splitter output port of an $I^{th}$ beam splitter, and the $(2M-K+1-I+1)^{th}$ input port is coupled to another first beam splitter output port of a $(2M-K+1-I+1)^{th}$ beam splitter, and wherein the $K^{th}$ control module comprises:
    2M−K couplers, wherein a second beam splitter output port of the $I^{th}$ beam splitter and another second beam splitter output port of the $(2M-K+1-I+1)^{th}$ beam splitter are coupled to a coupler input port of a $J^{th}$ coupler of the 2M−K couplers, wherein $1 \leq J \leq 2M-K$, and wherein the $J^{th}$ coupler is configured to couple input optical signals and obtain a coupled optical signal;
    2M−K photodetectors, wherein a coupler output port of the $J^{th}$ coupler is coupled to a photodetector input port of a $J^{th}$ photodetector from the 2M−K photodetectors, and wherein the $J^{th}$ photodetector is configured to detect the coupled optical signal; and
    2M−K phase control apparatuses, wherein a photodetector output port of the $J^{th}$ photodetector is electrically coupled to a phase control input port of a phase control apparatus of the 2M−K phase control apparatuses, wherein the phase control apparatus comprises a phase control output port that is electrically coupled to each phase shifter in the $K^{th}$ optical power adjustment module, wherein the phase control apparatus is configured to adjust an $I^{th}$ phase shifter in the $K^{th}$ optical power adjustment module based on a detection result of the $J^{th}$ photodetector, and wherein the $I^{th}$ phase shifter is coupled to the $I^{th}$ input port or the $(2M-K+1-I+1)^{th}$ input port.

19. The optical power adjustment apparatus according to claim 13, wherein the $K^{th}$ optical power adjustment module further comprises a plurality of beam splitters, each configured to:
    split an input optical signal into a plurality of first input optical signals;
    output one of the split first input optical signals to an MMI corresponding to a beam splitter in the $(K+1)^{th}$ optical power adjustment module; and
    output another of the split first input optical signals to a $K^{th}$ control module from M control modules, wherein 2M−K+1 output ports of each MMI in the $K^{th}$ optical power adjustment module are respectively coupled to first beam splitter input ports of 2M−K+1 beam splitters of the plurality of beam splitters,
wherein the control apparatus comprises the M control modules, and first beam splitter output ports of the 2M−K+1 beam splitters are coupled to MMI input ports of 2K MMIs in the $(K+1)^{th}$ optical power adjustment module, wherein second beam splitter output ports of the 2M−K+1 beam splitters are coupled to the $K^{th}$ control module, and
wherein the $K^{th}$ control module is electrically coupled to each phase shifter in the $K^{th}$ optical power adjustment module, and is configured to:
    detect one of the first input optical signals; and
    adjust each phase shifter in the $K^{th}$ optical power adjustment module based on a result of detecting the one of the first input optical signals.

20. The optical power adjustment apparatus according to claim 19, wherein the $K^{th}$ control module comprises:
    2M−K+1 photodetectors each configured to detect a corresponding input optical signal, wherein the second beam splitter output ports of the 2M−K+1 beam splitters are coupled to photodetector input ports of the 2M−K+1 photodetectors, wherein an $I^{th}$ photodetector from the 2M−K+1 photodetectors is configured to detect a first input optical signal, wherein a first photodetector input port of the $I^{th}$ photodetector is coupled to a third beam splitter output port of an $I^{th}$ beam splitter from the second beam splitter output ports, wherein a $(2M-K+1-I+1)^{th}$ photodetector from the 2M−K+1 photodetectors is configured to detect a second input optical signal, and wherein a second photodetector input port of the $(2M-K+1-I+1)^{th}$ photodetector is coupled to a third beam splitter output port of a $(2M-K+1-I+1)^{th}$ beam splitter from the second beam splitter output ports; and
    2M−K phase control apparatuses, wherein photodetector output ports of the 2M−K+1 photodetectors are electrically coupled to a phase control input port of a phase control apparatus that is configured to adjust each phase shifter in the $K^{th}$ optical power adjustment module based on a detection result of each of the 2M−K+1 photodetectors, wherein the phase control apparatus comprises a phase control output port that is electrically coupled to each phase shifter in the $K^{th}$ optical power adjustment module, wherein the phase control apparatus is configured to adjust an $I^{th}$ phase shifter in the $K^{th}$ optical power adjustment module based on detection results of the $I^{th}$ photodetector and the $(2M-K+1-I+1)^{th}$ photodetector, and wherein the $I^{th}$ phase shifter is connected to the $I^{th}$ input port or the $(2M-K+1-I+1)^{th}$ input port.

* * * * *